(12) United States Patent
Ku et al.

(10) Patent No.: US 9,232,276 B2
(45) Date of Patent: *Jan. 5, 2016

(54) SYSTEM AND METHOD FOR PRESENTING SUPPORT SERVICES

(71) Applicant: AT&T Intellectual Property I, LP, Atlanta, GA (US)

(72) Inventors: Bernard Ku, Austin, TX (US); Arshad Khan, Austin, TX (US); Niral Sheth, Austin, TX (US)

(73) Assignee: AT&T INTELLECTUAL PROPERTY I, LP, Atlanta, GA (US)

( * ) Notice: Subject to any disclaimer, the term of this patent is extended or adjusted under 35 U.S.C. 154(b) by 3 days.

This patent is subject to a terminal disclaimer.

(21) Appl. No.: 14/230,979

(22) Filed: Mar. 31, 2014

(65) Prior Publication Data

US 2014/0215502 A1  Jul. 31, 2014

Related U.S. Application Data

(63) Continuation of application No. 12/054,975, filed on Mar. 25, 2008, now Pat. No. 8,726,323.

(51) Int. Cl.
| | |
|---|---|
| *H04N 21/4788* | (2011.01) |
| *H04N 21/239* | (2011.01) |
| *H04N 21/254* | (2011.01) |
| *H04N 21/442* | (2011.01) |
| *G06Q 10/06* | (2012.01) |
| *H04N 21/4425* | (2011.01) |
| *H04N 21/472* | (2011.01) |

(Continued)

(52) U.S. Cl.
CPC .......... *H04N 21/4788* (2013.01); *G06Q 10/06* (2013.01); *H04N 21/2393* (2013.01); *H04N 21/254* (2013.01); *H04N 21/2543* (2013.01); *H04N 21/4425* (2013.01); *H04N 21/44231* (2013.01); *H04N 21/472* (2013.01); *H04N 21/478* (2013.01)

(58) Field of Classification Search
CPC .............. G06Q 10/06; H04N 21/4788; H04N 21/2393; H04N 21/254; H04N 21/44231; H04N 21/4425; H04N 21/2543
See application file for complete search history.

(56) References Cited

U.S. PATENT DOCUMENTS

| | | |
|---|---|---|
| 5,790,173 A | 8/1998 | Strauss et al. |
| 5,907,547 A | 5/1999 | Foladare et al. |

(Continued)

FOREIGN PATENT DOCUMENTS

EP     1224809 A1    7/2002

OTHER PUBLICATIONS

Counterpath, Corporation, "X-Lite, The World's Favorite Free Softphone", 3 pgs., http://www.counterpath.com/13, website last visited Mar. 10, 2008.

*Primary Examiner* — Hai V Tran
(74) *Attorney, Agent, or Firm* — Guntin & Gust, PLC; Jay H. Anderson

(57) ABSTRACT

A system that incorporates teachings of the present disclosure may include, for example, system having a controller to receive from a set-top box (STB) a request for assistance, identify a subscriber account associated with the STB, identify from the subscriber account a subscription grade, select one of a plurality of subscriber support services according to the subscriber grade, and establish communications between the STB and the selected subscriber support service. Other embodiments are disclosed.

20 Claims, 8 Drawing Sheets

(51) Int. Cl.
*H04N 21/478* (2011.01)
*H04N 21/2543* (2011.01)

(56) References Cited

U.S. PATENT DOCUMENTS

| | | |
|---|---|---|
| 6,493,695 B1 * | 12/2002 | Pickering et al. ............... 706/47 |
| 6,745,245 B1 | 6/2004 | Carpenter |
| 7,693,270 B2 | 4/2010 | Beck et al. |
| 2001/0054003 A1 | 12/2001 | Chien et al. |
| 2003/0043180 A1 | 3/2003 | Gusler et al. |
| 2004/0236820 A1 | 11/2004 | Flocken |
| 2005/0039214 A1 * | 2/2005 | Lorenz et al. ............... 725/105 |
| 2007/0121584 A1 * | 5/2007 | Qiu et al. ............... 370/352 |
| 2008/0046269 A1 | 2/2008 | Lopez |

* cited by examiner

500

SYSTEM AND METHOD FOR PRESENTING SUPPORT SERVICES

CROSS-REFERENCE TO RELATED APPLICATION(S)

This application is a continuation of U.S. patent application Ser. No. 12/054,975 filed Mar. 25, 2008, entitled "System and Method for Presenting Support Services," which is incorporated herein by reference in its entirety.

FIELD OF THE DISCLOSURE

The present disclosure relates generally to support services and more specifically to a system and method for presenting support services.

BACKGROUND

Media services such as video, voice, and music presented by devices such as a set-top box, a digital video recorder, a media player, and other forms of media presentation devices continue to evolve in sophistication and complexity. In some instances, a level of technical expertise may be required by a user to manage a media device or to utilize the services presented thereby.

DETAILED DESCRIPTION

One embodiment of the present disclosure entails a system having a controller to receive from a set-top box (STB) a request for assistance, identify a subscriber account associated with the STB, identify from the subscriber account a subscription grade, select one of a plurality of subscriber support services according to the subscriber grade, and establish communications between the STB and the selected subscriber support service.

Another embodiment of the present disclosure entails a method involving receiving from a media processor a request for assistance, identifying a subscriber associated with the media processor, determining a grade of service from one or more media services supplied to the subscriber by a media communication system, and providing the media processor a support service according to the determined grade of service.

Yet another embodiment of the present disclosure entails a computer-readable storage medium in a media processor having computer instructions for detecting a request for assistance, and presenting a support service according to a grade of service determined for a subscriber of the media processor.

Figure 1:
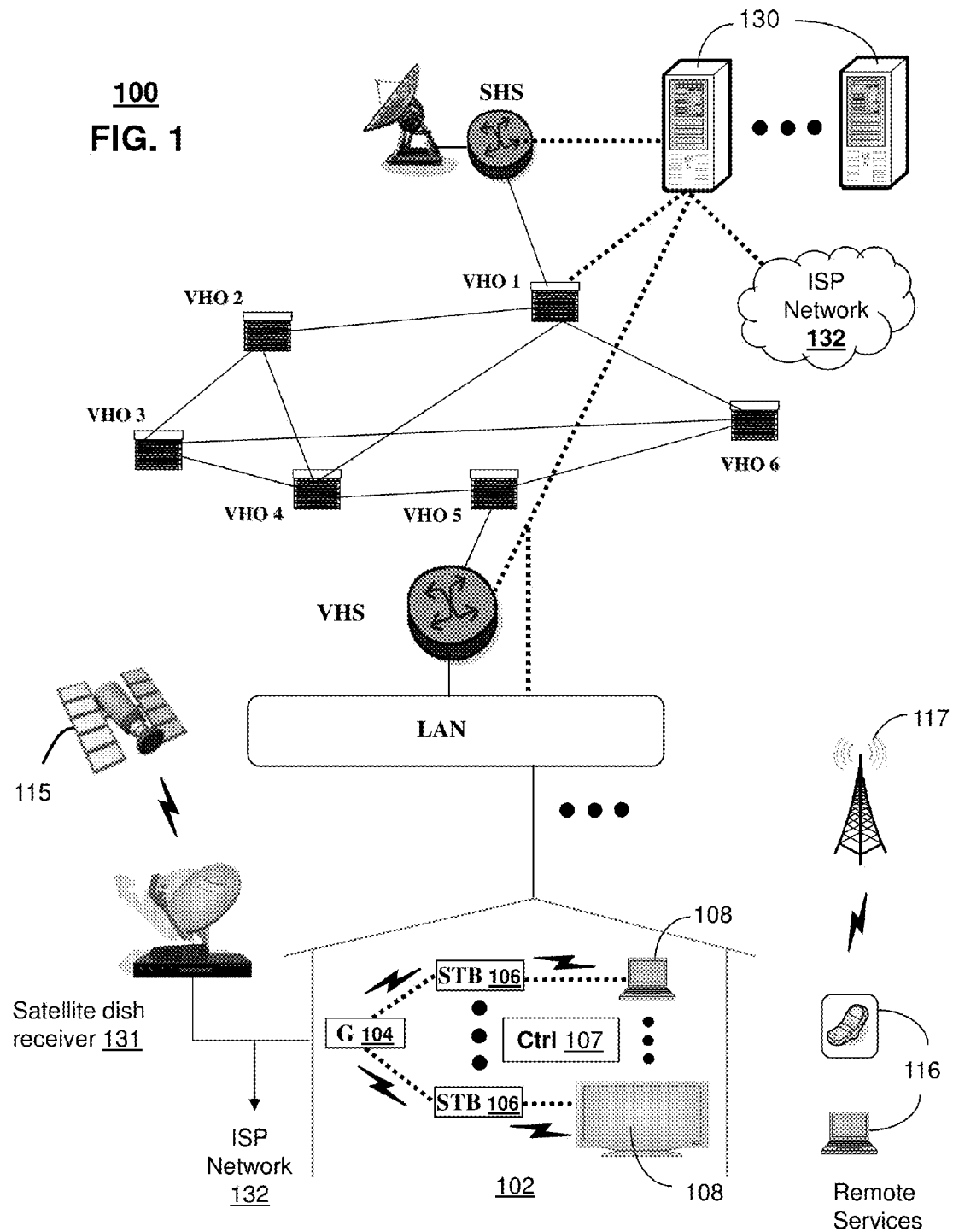
FIGS. 1-4 depict exemplary embodiments of communication systems that provide media services.

FIG. 1 depicts an exemplary embodiment of a first communication system 100 for delivering media content. The communication system 100 can represent an Internet Protocol Television (IPTV) broadcast media system. In a typical IPTV infrastructure, there is at least one super head-end office server (SHS) which receives national media programs from satellite and/or media servers from service providers of multimedia broadcast channels. In the present context, media programs can represent audio content, moving image content such as videos, still image content, and/or combinations thereof. The SHS server forwards IP packets associated with the media content to video head-end servers (VHS) via a network of aggregation points such as video head-end offices (VHO) according to a common multicast communication method.

The VHS then distributes multimedia broadcast programs via a local area network (LAN) to commercial and/or residential buildings 102 housing a gateway 104 (e.g., a residential gateway or RG). The LAN can represent a bank of digital subscriber line access multiplexers (DSLAMs) located in a central office or a service area interface that provide broadband services over optical links or copper twisted pairs to buildings 102. The gateway 104 distributes broadcast signals to media processors 106 such as Set-Top Boxes (STBs) which in turn present broadcast selections to media devices 108 such as computers or television sets managed in some instances by a media controller 107 (e.g., an infrared or RF remote control). Unicast traffic can also be exchanged between the media processors 106 and subsystems of the IPTV media system for services such as video-on-demand (VoD). It will be appreciated by one of ordinary skill in the art that the media devices 108 and/or portable communication devices 116 shown in FIG. 1 can be an integral part of the media processor 106 and can be communicatively coupled to the gateway 104. In this particular embodiment, an integral device such as described can receive, respond, process and present multicast or unicast media content.

The IPTV media system can be coupled to one or more computing devices 130 a portion of which can operate as a web server for providing portal services over an Internet Service Provider (ISP) network 132 to fixed line media devices 108 or portable communication devices 116 by way of a wireless access point 117 providing Wireless Fidelity or WiFi services, or cellular communication services (e.g., GSM, CDMA, UMTS, WiMAX, etc.).

Another distinct portion of the one or more computing devices 130 can be used as a support services system (identified herein by reference 130) for managing support services presented to subscribers of the communication system 100. The support services system 130 can be represented collectively by a number of computing devices of communication system 100 including without limitation a billing subsystem, a scheduling subsystem, a notification subsystem, a customer support subsystem, an interactive voice response (IVR) system utilizing common voice recognition and synthesized voice response technology, and a data messaging system for collecting and responding to data messages such as email, instant messages, short messaging service (SMS) messages, or multimedia messaging service (MMS) messages, just to mention a few. The support service system 130 can direct and schedule communications between agents of the media communication system 100 and a media processor such as the STB 106. An agent in the present context can represent a human agent, the IVR system, or the data messaging system of the support services system 130.

A satellite broadcast television system can be used in place of the IPTV media system. In this embodiment, signals transmitted by a satellite 115 can be intercepted by a satellite dish receiver 131 coupled to building 102 which conveys media signals to the media processors 106. The media receivers 106 can be equipped with a broadband port to the ISP network 132. Although not shown, the communication system 100 can also be combined or replaced with analog or digital broadcast distributions systems such as cable TV systems.

Figure 2:
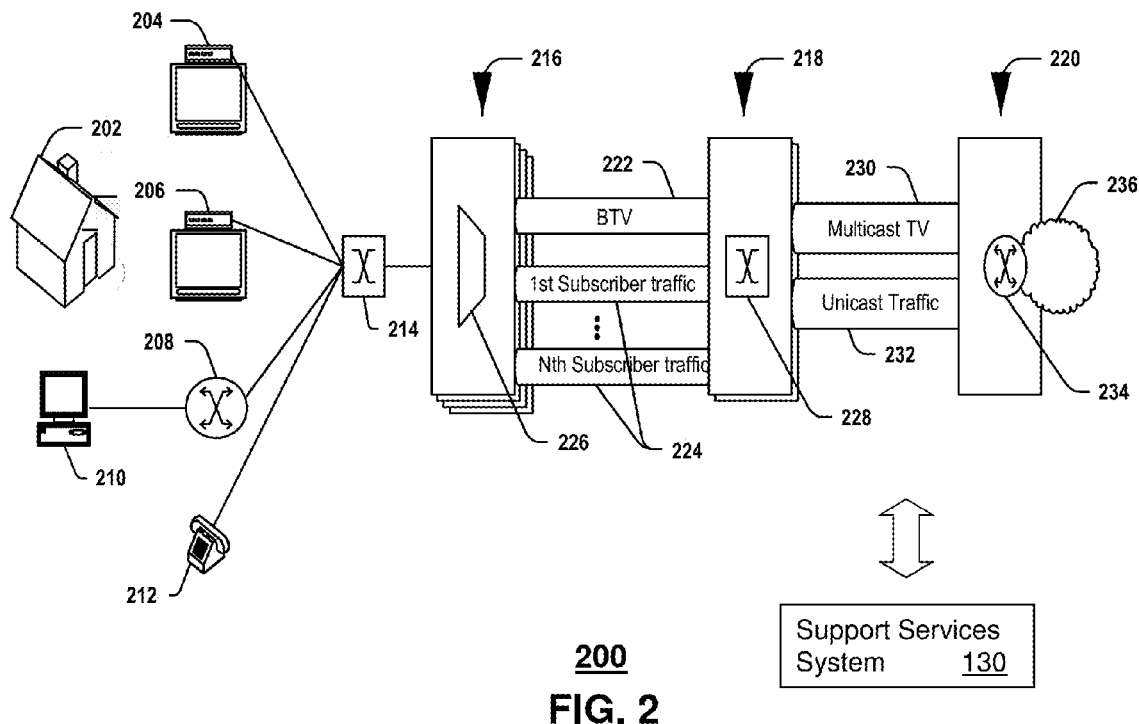

FIG. 2 depicts an exemplary embodiment of a second communication system 200 for delivering media content. Communication system 200 can be overlaid or operably coupled with communication system 100 as another representative embodiment of said communication system. The system 200 includes a distribution switch/router system 228 at a central office 218. The distribution switch/router system 228 receives video data via a multicast television stream 230 from a second distribution switch/router 234 at an intermediate office 220. The multicast television stream 230 includes Internet Protocol (IP) data packets addressed to a multicast IP address associated with a television channel. The distribution switch/router system 228 can cache data associated with each television channel received from the intermediate office 220.

The distribution switch/router system 228 also receives unicast data traffic from the intermediate office 220 via a unicast traffic stream 232. The unicast traffic stream 232 includes data packets related to devices located at a particular residence, such as the residence 202. For example, the unicast traffic stream 232 can include data traffic related to a digital subscriber line, a telephone line, another data connection, or any combination thereof. To illustrate, the unicast traffic stream 232 can communicate data packets to and from a telephone 212 associated with a subscriber at the residence 202. The telephone 212 can be a Voice over Internet Protocol (VoIP) telephone. To further illustrate, the unicast traffic stream 232 can communicate data packets to and from a personal computer 210 at the residence 202 via one or more data routers 208. In an additional illustration, the unicast traffic stream 232 can communicate data packets to and from a set-top box device, such as the set-top box devices 204, 206. The unicast traffic stream 232 can communicate data packets to and from the devices located at the residence 202 via one or more residential gateways 214 associated with the residence 202.

The distribution switch/router system 228 can send data to one or more access switch/router systems 226. The access switch/router system 226 can include or be included within a service area interface 216. In a particular embodiment, the access switch/router system 226 can include a DSLAM. The access switch/router system 226 can receive data from the distribution switch/router system 228 via a broadcast television (BTV) stream 222 and a plurality of unicast subscriber traffic streams 224. The BTV stream 222 can be used to communicate video data packets associated with a multicast stream.

For example, the BTV stream 222 can include a multicast virtual local area network (VLAN) connection between the distribution switch/router system 228 and the access switch/router system 226. Each of the plurality of subscriber traffic streams 224 can be used to communicate subscriber specific data packets. For example, the first subscriber traffic stream can communicate data related to a first subscriber, and the nth subscriber traffic stream can communicate data related to an nth subscriber. Each subscriber to the system 200 can be associated with a respective subscriber traffic stream 224. The subscriber traffic stream 224 can include a subscriber VLAN connection between the distribution switch/router system 228 and the access switch/router system 226 that is associated with a particular set-top box device 204, 206, a particular residence 202, a particular residential gateway 214, another device associated with a subscriber, or any combination thereof.

In an illustrative embodiment, a set-top box device, such as the set-top box device 204, receives a channel change command from an input device, such as a remoter control device. The channel change command can indicate selection of an IPTV channel. After receiving the channel change command, the set-top box device 204 generates channel selection data that indicates the selection of the IPTV channel. The set-top box device 204 can send the channel selection data to the access switch/router system 226 via the residential gateway 214. The channel selection data can include an Internet Group Management Protocol (IGMP) Join request. In an illustrative embodiment, the access switch/router system 226 can identify whether it is joined to a multicast group associated with the requested channel based on information in the IGMP Join request.

If the access switch/router system 226 is not joined to the multicast group associated with the requested channel, the access switch/router system 226 can generate a multicast stream request. The multicast stream request can be generated by modifying the received channel selection data. In an illustrative embodiment, the access switch/router system 226 can modify an IGMP Join request to produce a proxy IGMP Join request. The access switch/router system 226 can send the multicast stream request to the distribution switch/router system 228 via the BTV stream 222. In response to receiving the multicast stream request, the distribution switch/router system 228 can send a stream associated with the requested channel to the access switch/router system 226 via the BTV stream 222.

The support services system 130 of FIG. 1 can be operably coupled to the second communication system 200 for purposes similar to those described above.

Figure 3:
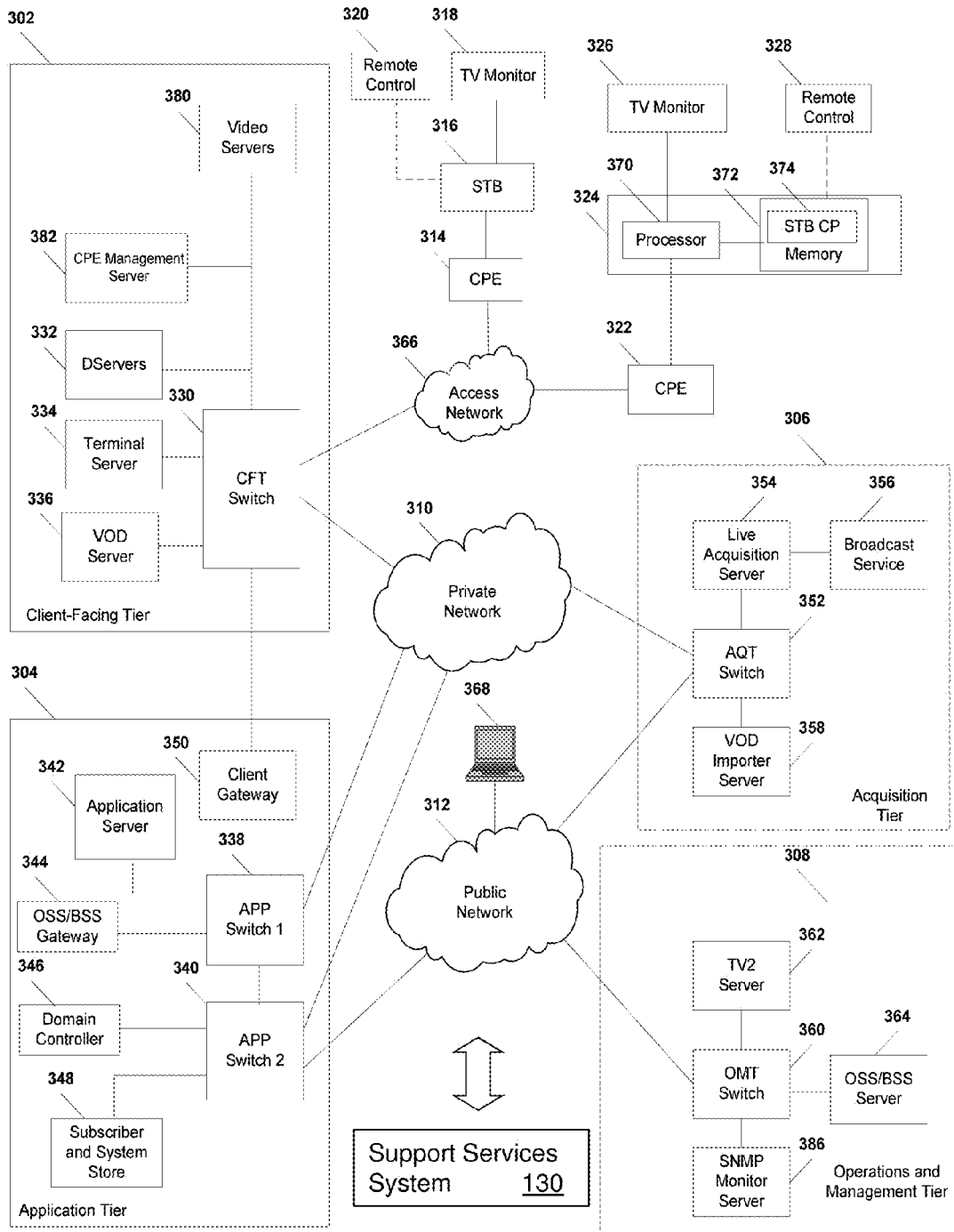

FIG. 3 depicts an exemplary embodiment of a third communication system 300 for delivering media content. Communication system 300 can be overlaid or operably coupled with communication systems 100-200 as another representative embodiment of said communication systems. As shown, the system 300 can include a client facing tier 302, an application tier 304, an acquisition tier 306, and an operations and management tier 308. Each tier 302, 304, 306, 308 is coupled to a private network 310, such as a network of common packet-switched routers and/or switches; to a public network 312, such as the Internet; or to both the private network 310 and the public network 312. For example, the client-facing tier 302 can be coupled to the private network 310. Further, the application tier 304 can be coupled to the private network 310 and to the public network 312. The acquisition tier 306 can also be coupled to the private network 310 and to the public network 312. Additionally, the operations and management tier 308 can be coupled to the public network 322.

As illustrated in FIG. 3, the various tiers 302, 304, 306, 308 communicate with each other via the private network 310 and the public network 312. For instance, the client-facing tier 302 can communicate with the application tier 304 and the acquisition tier 306 via the private network 310. The application tier 304 can communicate with the acquisition tier 306 via the private network 310. Further, the application tier 304 can communicate with the acquisition tier 306 and the operations and management tier 308 via the public network 312. Moreover, the acquisition tier 306 can communicate with the operations and management tier 308 via the public network 312. In a particular embodiment, elements of the application tier 304, including, but not limited to, a client gateway 350, can communicate directly with the client-facing tier 302.

The client-facing tier 302 can communicate with user equipment via an access network 366, such as an IPTV access network. In an illustrative embodiment, customer premises equipment (CPE) 314, 322 can be coupled to a local switch, router, or other device of the access network 366. The client-facing tier 302 can communicate with a first representative set-top box device 316 via the first CPE 314 and with a second representative set-top box device 324 via the second CPE 322. In a particular embodiment, the first representative set-top box device 316 and the first CPE 314 can be located at a first customer premise, and the second representative set-top box device 324 and the second CPE 322 can be located at a second customer premise.

In another particular embodiment, the first representative set-top box device 316 and the second representative set-top box device 324 can be located at a single customer premise, both coupled to one of the CPE 314, 322. The CPE 314, 322 can include routers, local area network devices, modems, such as digital subscriber line (DSL) modems, any other suitable devices for facilitating communication between a set-top box device and the access network 366, or any combination thereof.

In an exemplary embodiment, the client-facing tier 302 can be coupled to the CPE 314, 322 via fiber optic cables. In another exemplary embodiment, the CPE 314, 322 can include DSL modems that are coupled to one or more network nodes via twisted pairs, and the client-facing tier 302 can be coupled to the network nodes via fiber-optic cables. Each set-top box device 316, 324 can process data received via the access network 366, via a common IPTV software platform.

The first set-top box device 316 can be coupled to a first external display device, such as a first television monitor 318, and the second set-top box device 324 can be coupled to a second external display device, such as a second television monitor 326. Moreover, the first set-top box device 316 can communicate with a first remote control 320, and the second set-top box device 324 can communicate with a second remote control 328. The set-top box devices 316, 324 can include IPTV set-top box devices; video gaming devices or consoles that are adapted to receive IPTV content; personal computers or other computing devices that are adapted to emulate set-top box device functionalities; any other device adapted to receive IPTV content and transmit data to an IPTV system via an access network; or any combination thereof.

In an exemplary, non-limiting embodiment, each set-top box device 316, 324 can receive data, video, or any combination thereof, from the client-facing tier 302 via the access network 366 and render or display the data, video, or any combination thereof, at the display device 318, 326 to which it is coupled. In an illustrative embodiment, the set-top box devices 316, 324 can include tuners that receive and decode television programming signals or packet streams for transmission to the display devices 318, 326. Further, the set-top box devices 316, 324 can each include a STB processor 370 and a STB memory device 372 that is accessible to the STB processor 370. In one embodiment, a computer program, such as the STB computer program 374, can be embedded within the STB memory device 372.

In an illustrative embodiment, the client-facing tier 302 can include a client-facing tier (CFT) switch 330 that manages communication between the client-facing tier 302 and the access network 366 and between the client-facing tier 302 and the private network 310. As illustrated, the CFT switch 330 is coupled to one or more distribution servers, such as Distribution-servers (D-servers) 332, that store, format, encode, replicate, or otherwise manipulate or prepare video content for communication from the client-facing tier 302 to the set-top box devices 316, 324. The CFT switch 330 can also be coupled to a terminal server 334 that provides terminal devices with a point of connection to the IPTV system 300 via the client-facing tier 302.

In a particular embodiment, the CFT switch 330 can be coupled to a video-on-demand (VOD) server 336 that stores or provides VOD content imported by the IPTV system 300. Further, the CFT switch 330 is coupled to one or more video servers 380 that receive video content and transmit the content to the set-top boxes 316, 324 via the access network 366. The client-facing tier 302 may include a CPE management server 382 that manages communications to and from the CPE 314 and the CPE 322. For example, the CPE management server 382 may collect performance data associated with the set-top box devices 316, 324 from the CPE 314 or the CPE 322 and forward the collected performance data to a server associated with the operations and management tier 308.

In an illustrative embodiment, the client-facing tier 302 can communicate with a large number of set-top boxes, such as the representative set-top boxes 316, 324, over a wide geographic area, such as a metropolitan area, a viewing area, a statewide area, a regional area, a nationwide area or any other suitable geographic area, market area, or subscriber or customer group that can be supported by networking the client-facing tier 302 to numerous set-top box devices. In a particular embodiment, the CFT switch 330, or any portion thereof, can include a multicast router or switch that communicates with multiple set-top box devices via a multicast-enabled network.

As illustrated in FIG. 3, the application tier 304 can communicate with both the private network 310 and the public network 312. The application tier 304 can include a first application tier (APP) switch 338 and a second APP switch 340. In a particular embodiment, the first APP switch 338 can be coupled to the second APP switch 340. The first APP switch 338 can be coupled to an application server 342 and to an OSS/BSS gateway 344. In a particular embodiment, the application server 342 can provide applications to the set-top box devices 316, 324 via the access network 366, which enable the set-top box devices 316, 324 to provide functions, such as interactive program guides, video gaming, display, messaging, processing of VOD material and other IPTV content, etc. In an illustrative embodiment, the application server 342 can provide location information to the set-top box devices 316, 324. In a particular embodiment, the OSS/BSS gateway 344 includes operation systems and support (OSS) data, as well as billing systems and support (BSS) data. In one embodiment, the OSS/BSS gateway 344 can provide or restrict access to an OSS/BSS server 364 that stores operations and billing systems data.

The second APP switch 340 can be coupled to a domain controller 346 that provides Internet access, for example, to users at their computers 368 via the public network 312. For example, the domain controller 346 can provide remote Internet access to IPTV account information, e-mail, personalized Internet services, or other online services via the public network 312. In addition, the second APP switch 340 can be coupled to a subscriber and system store 348 that includes account information, such as account information that is associated with users who access the IPTV system 300 via the private network 310 or the public network 312. In an illustrative embodiment, the subscriber and system store 348 can store subscriber or customer data and create subscriber or customer profiles that are associated with IP addresses, stock-keeping unit (SKU) numbers, other identifiers, or any combination thereof, of corresponding set-top box devices 316, 324. In another illustrative embodiment, the subscriber and system store can store data associated with capabilities of set-top box devices associated with particular customers.

In a particular embodiment, the application tier 304 can include a client gateway 350 that communicates data directly to the client-facing tier 302. In this embodiment, the client gateway 350 can be coupled directly to the CFT switch 330. The client gateway 350 can provide user access to the private network 310 and the tiers coupled thereto. In an illustrative embodiment, the set-top box devices 316, 324 can access the IPTV system 300 via the access network 366, using information received from the client gateway 350. User devices can access the client gateway 350 via the access network 366, and the client gateway 350 can allow such devices to access the private network 310 once the devices are authenticated or verified. Similarly, the client gateway 350 can prevent unauthorized devices, such as hacker computers or stolen set-top box devices from accessing the private network 310, by denying access to these devices beyond the access network 366.

For example, when the first representative set-top box device 316 accesses the client-facing tier 302 via the access network 366, the client gateway 350 can verify subscriber information by communicating with the subscriber and system store 348 via the private network 310. Further, the client gateway 350 can verify billing information and status by communicating with the OSS/BSS gateway 344 via the private network 310. In one embodiment, the OSS/BSS gateway 344 can transmit a query via the public network 312 to the OSS/BSS server 364. After the client gateway 350 confirms subscriber and/or billing information, the client gateway 350 can allow the set-top box device 316 to access IPTV content and VOD content at the client-facing tier 302. If the client gateway 350 cannot verify subscriber information for the set-top box device 316, e.g., because it is connected to an unauthorized twisted pair, the client gateway 350 can block transmissions to and from the set-top box device 316 beyond the access network 366.

As indicated in FIG. 3, the acquisition tier 306 includes an acquisition tier (AQT) switch 352 that communicates with the private network 310. The AQT switch 352 can also communicate with the operations and management tier 308 via the public network 312. In a particular embodiment, the AQT switch 352 can be coupled to one or more live Acquisition-servers (A-servers) 354 that receive or acquire television content, movie content, advertisement content, other video content, or any combination thereof, from a broadcast service 356, such as a satellite acquisition system or satellite head-end office. In a particular embodiment, the live acquisition server 354 can transmit content to the AQT switch 352, and the AQT switch 352 can transmit the content to the CFT switch 330 via the private network 310.

In an illustrative embodiment, content can be transmitted to the D-servers 332, where it can be encoded, formatted, stored, replicated, or otherwise manipulated and prepared for communication from the video server(s) 380 to the set-top box devices 316, 324. The CFT switch 330 can receive content from the video server(s) 380 and communicate the content to the CPE 314, 322 via the access network 366. The set-top box devices 316, 324 can receive the content via the CPE 314, 322, and can transmit the content to the television monitors 318, 326. In an illustrative embodiment, video or audio portions of the content can be streamed to the set-top box devices 316, 324.

Further, the AQT switch 352 can be coupled to a video-on-demand importer server 358 that receives and stores television or movie content received at the acquisition tier 306 and communicates the stored content to the VOD server 336 at the client-facing tier 302 via the private network 310. Additionally, at the acquisition tier 306, the video-on-demand (VOD) importer server 358 can receive content from one or more VOD sources outside the IPTV system 300, such as movie studios and programmers of non-live content. The VOD importer server 358 can transmit the VOD content to the AQT switch 352, and the AQT switch 352, in turn, can communicate the material to the CFT switch 330 via the private network 310. The VOD content can be stored at one or more servers, such as the VOD server 336.

When users issue requests for VOD content via the set-top box devices 316, 324, the requests can be transmitted over the access network 366 to the VOD server 336, via the CFT switch 330. Upon receiving such requests, the VOD server 336 can retrieve the requested VOD content and transmit the content to the set-top box devices 316, 324 across the access network 366, via the CFT switch 330. The set-top box devices 316, 324 can transmit the VOD content to the television monitors 318, 326. In an illustrative embodiment, video or audio portions of VOD content can be streamed to the set-top box devices 316, 324.

FIG. 3 further illustrates that the operations and management tier 308 can include an operations and management tier (OMT) switch 360 that conducts communication between the operations and management tier 308 and the public network 312. In the embodiment illustrated by FIG. 3, the OMT switch 360 is coupled to a TV2 server 362. Additionally, the OMT switch 360 can be coupled to an OSS/BSS server 364 and to a simple network management protocol monitor 386 that monitors network devices within or coupled to the IPTV system 300. In a particular embodiment, the OMT switch 360 can communicate with the AQT switch 352 via the public network 312.

The OSS/BSS server 364 may include a cluster of servers, such as one or more CPE data collection servers that are adapted to request and store operations systems data, such as performance data from the set-top box devices 316, 324. In an illustrative embodiment, the CPE data collection servers may be adapted to analyze performance data to identify a condition of a physical component of a network path associated with a set-top box device, to predict a condition of a physical component of a network path associated with a set-top box device, or any combination thereof.

In an illustrative embodiment, the live acquisition server 354 can transmit content to the AQT switch 352, and the AQT switch 352, in turn, can transmit the content to the OMT switch 360 via the public network 312. In this embodiment, the OMT switch 360 can transmit the content to the TV2 server 362 for display to users accessing the user interface at the TV2 server 362. For example, a user can access the TV2 server 362 using a personal computer 368 coupled to the public network 312.

The support services system 130 of FIGS. 1-2 can be operably coupled to the third communication system 300 for purposes similar to those described above.

It should be apparent to one of ordinary skill in the art from the foregoing media communication system embodiments that other suitable media communication systems for distributing broadcast media content as well as peer-to-peer exchange of content can be applied to the present disclosure.

Figure 4:
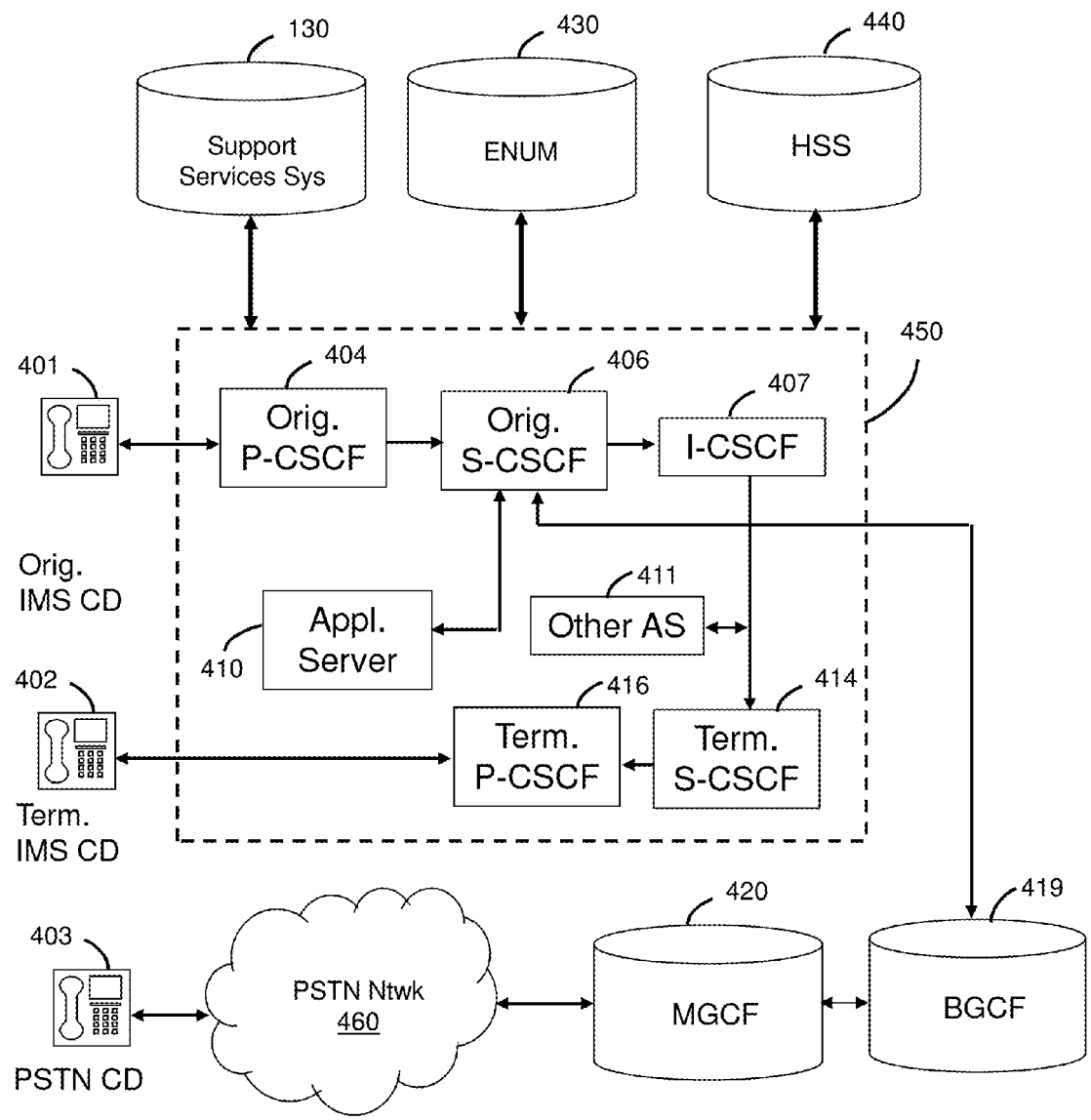

FIG. 4 depicts an exemplary embodiment of a communication system 400 employing a IP Multimedia Subsystem (IMS) network architecture. Communication system 400 can be overlaid or operably coupled with communication systems 100-300 as another representative embodiment of said communication systems.

The communication system 400 can comprise a Home Subscriber Server (HSS) 440, a tElephone NUmber Mapping (ENUM) server 430, and network elements of an IMS network 450. The IMS network 450 can be coupled to IMS compliant communication devices (CD) 401, 402 or a Public Switched Telephone Network (PSTN) CD 403 using a Media Gateway Control Function (MGCF) 420 that connects the call through a common PSTN network 460.

IMS CDs 401, 402 register with the IMS network 450 by contacting a Proxy Call Session Control Function (P-CSCF) which communicates with a corresponding Serving CSCF (S-CSCF) to register the CDs with an Authentication, Authorization and Accounting (AAA) support by the HSS 440. To accomplish a communication session between CDs, an originating IMS CD 401 can submit a SIP INVITE message to an originating P-CSCF 404 which communicates with a corresponding originating S-CSCF 406. The originating S-CSCF 406 can submit the SIP INVITE message to an application server (AS) such as reference 410 that can provide a variety of services to IMS subscribers. For example, the application server 410 can be used to perform originating treatment functions on the calling party number received by the originating S-CSCF 406 in the SIP INVITE message.

Originating treatment functions can include determining whether the calling party number has international calling services, and/or is requesting special telephony features (e.g., *72 forward calls, *73 cancel call forwarding, *67 for caller ID blocking, and so on). Additionally, the originating S-CSCF 406 can submit queries to the ENUM system 430 to translate an E.164 telephone number to a SIP Uniform Resource Identifier (URI) if the targeted communication device is IMS compliant. If the targeted communication device is a PSTN device, the ENUM system 430 will respond with an unsuccessful address resolution and the S-CSCF 406 will forward the call to the MGCF 420 via a Breakout Gateway Control Function (BGCF) 419.

When the ENUM server 430 returns a SIP URI, the SIP URI is used by an Interrogating CSCF (I-CSCF) 407 to submit a query to the HSS 440 to identify a terminating S-CSCF 414 associated with a terminating IMS CD such as reference 402. Once identified, the I-CSCF 407 can submit the SIP INVITE to the terminating S-CSCF 414 which can call on an application server 411 similar to reference 410 to perform the originating treatment telephony functions described earlier. The terminating S-CSCF 414 can then identify a terminating P-CSCF 416 associated with the terminating CD 402. The P-CSCF 416 then signals the CD 402 to establish communications. The aforementioned process is symmetrical. Accordingly, the terms "originating" and "terminating" in FIG. 4 can be interchanged.

IMS network 450 can also be operably coupled to the support services system 130 previously discussed for FIG. 1. In this representative embodiment, the support services system 130 can be accessed over a PSTN or VoIP channel of communication system 400 by common techniques such as described above.

Figure 5:
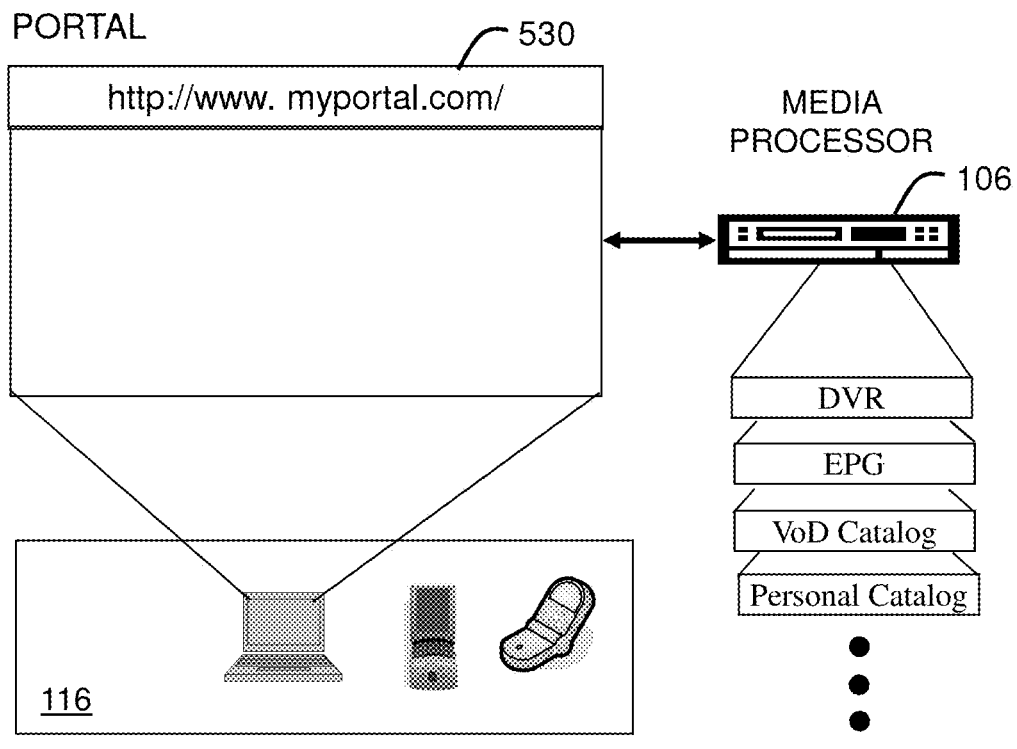
FIG. 5 depicts an exemplary embodiment of a portal interacting with at least one among the communication systems of FIGS. 1-4.

FIG. 5 depicts an exemplary embodiment of a portal 530. The portal 530 can be used for managing services of communication systems 100-400. The portal 530 can be accessed by a Uniform Resource Locator (URL) with a common Internet browser such as Microsoft's Internet Explorer using an Internet-capable communication device such as references 108, 116, or 210 of FIGS. 1-2. The portal 530 can be configured to access a media processor such as references 106, 204, 206, 316, and 324 of FIGS. 1-3 and services managed thereby such as a Digital Video Recorder (DVR), an Electronic Programming Guide (EPG), VOD catalog, a personal catalog stored in the STB (e.g., personal videos, pictures, audio recordings, etc.), and so on.

Figure 6:
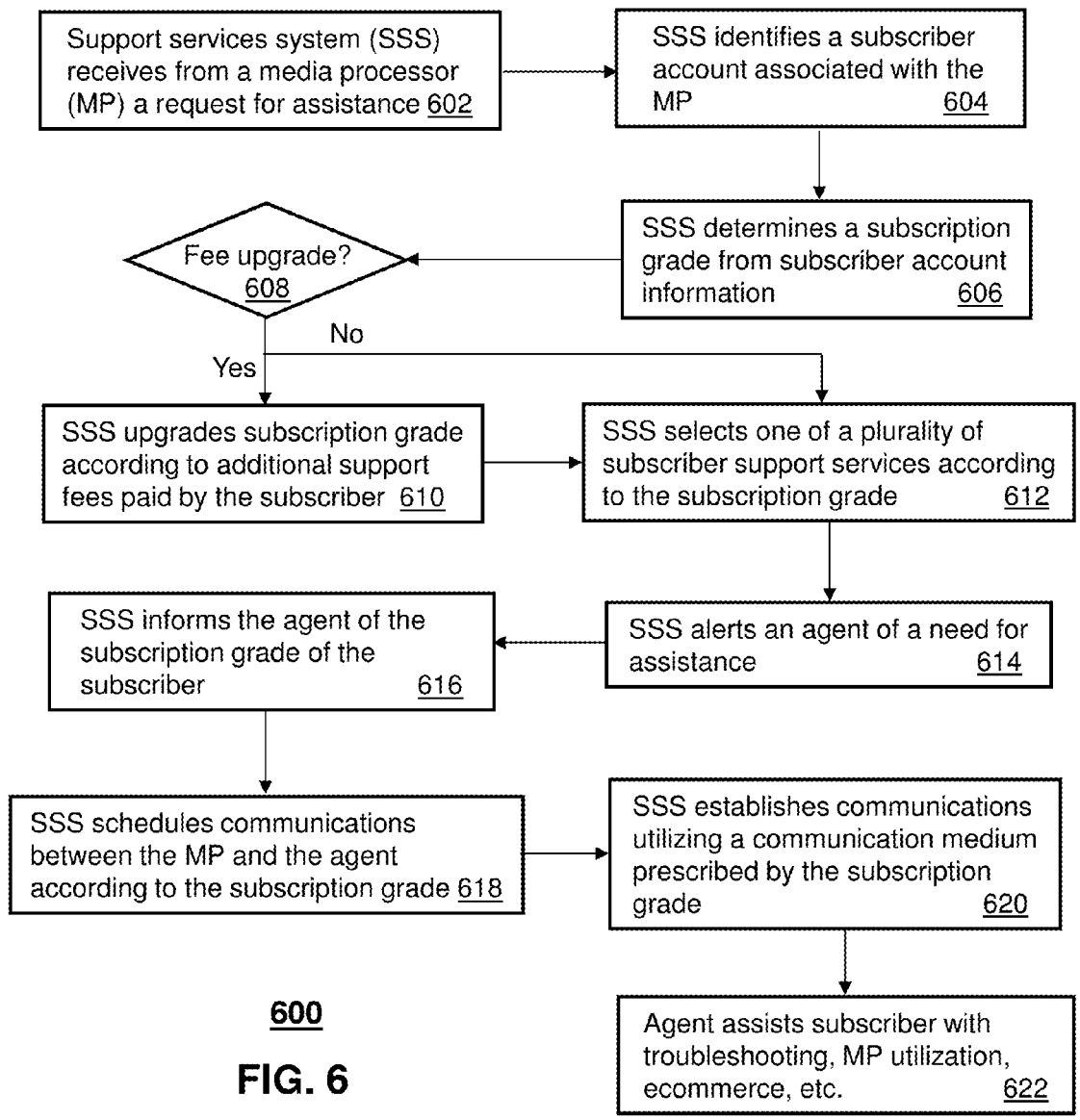
FIG. 6 depicts an exemplary method operating in portions of the communication systems of FIGS. 1-4.

FIG. 6 depicts an exemplary method 600 operating in portions of communication systems 100-400. Method 600 begins with step 602 in which the support services system (SSS) 130 receives from a media processor (MP) such as the STBs of FIGS. 1-3 a request for assistance. The request can be initiated by a user of the MP by depressing for example a help button on a remote controller such as reference 107 managing operations of the MP, or by selecting an on-screen menu presented by the MP. Upon detecting a help request, the MP can submit the request to the SSS 130 by way of the media communication system from which it operates. The request can include an identification of the MP (e.g., MAC address, serial no., static IP address, SIP URI, etc.) which the SSS 130 can utilize in step 604 to identify a corresponding subscriber account. The subscriber account can include information such as who the subscriber of the MP is, a gender and age of the subscriber, and what media services the subscriber has procured from a service provider of the media communication system.

In step 606, the SSS 130 can determine a subscription grade from the media services which the subscriber has procured. Suppose for instance that the media communication system can provide a plurality of services such as IPTV, VoIP, Internet access, and cellular communications. Further assume that each of these services can include a number of sub-services. For example, IPTV services might include a basic package (e.g., standard definition or SD channels only), a silver package (e.g., SD channels, and a limited number of high definition or HD channels), a gold package (e.g., SD+HD channels+HBO), and premium package (e.g., SD+HD channels+HBO+premium sports and entertainment channels in HD format). Sub-services can also be defined for VoIP, Internet access, and cellular services.

To reward its subscribers, the service provider of the media communication system can designate grades of services for combinations of these services, and or spending levels of the subscriber. Thus the more media services the subscriber procures and/or the more the subscriber spends, the higher the grade of service designation given to the subscriber. Additional metrics can be applied to determine a subscription grade of a subscriber. For instance, the subscriber's credit history can also factor into the grade of service determination. A subscriber who has not missed payments receives a grade of service higher than another subscriber who has missed payments and has a similar service package or level of expenditures. Accordingly a subscriber's grade of service can be negatively impacted by behaviors of the subscriber which do not comply with policies set forth by the service provider.

Subscribers who do not desire to procure additional media services but wish to upgrade their support service can do so by for example paying additional fees. In step 608, the SSS 130 can distinguish these subscribers according information in the subscriber account indicating that the subscriber has made this choice and is paying additional fees. Under these circumstances, the SSS 130 can be directed in step 610 to upgrade the subscription grade determined in step 606.

In step 612, the SSS 130 selects one of a plurality of subscriber support services offered by the service provider according to the subscription grade determined in step 606 or upgraded in step 610. The SSS 130 can alert in step 614 an agent of the media communication system that a user of a particular MP has requested assistance. The SSS 130 can inform the agent of the subscription grade of the subscriber so that it is understood what type of support service is expected.

In step 618 the SSS 130 can schedule communications between the MP and the agent according to the subscription grade. The SSS 130 can establish communications in step 620 utilizing a communication medium prescribed by the service provider according to the subscription grade. Once communications have been established, the agent can assist the subscriber with trouble shooting, utilization of MP operational features, ecommerce, or the functions of the MP or media services presented thereby.

Figure 7:
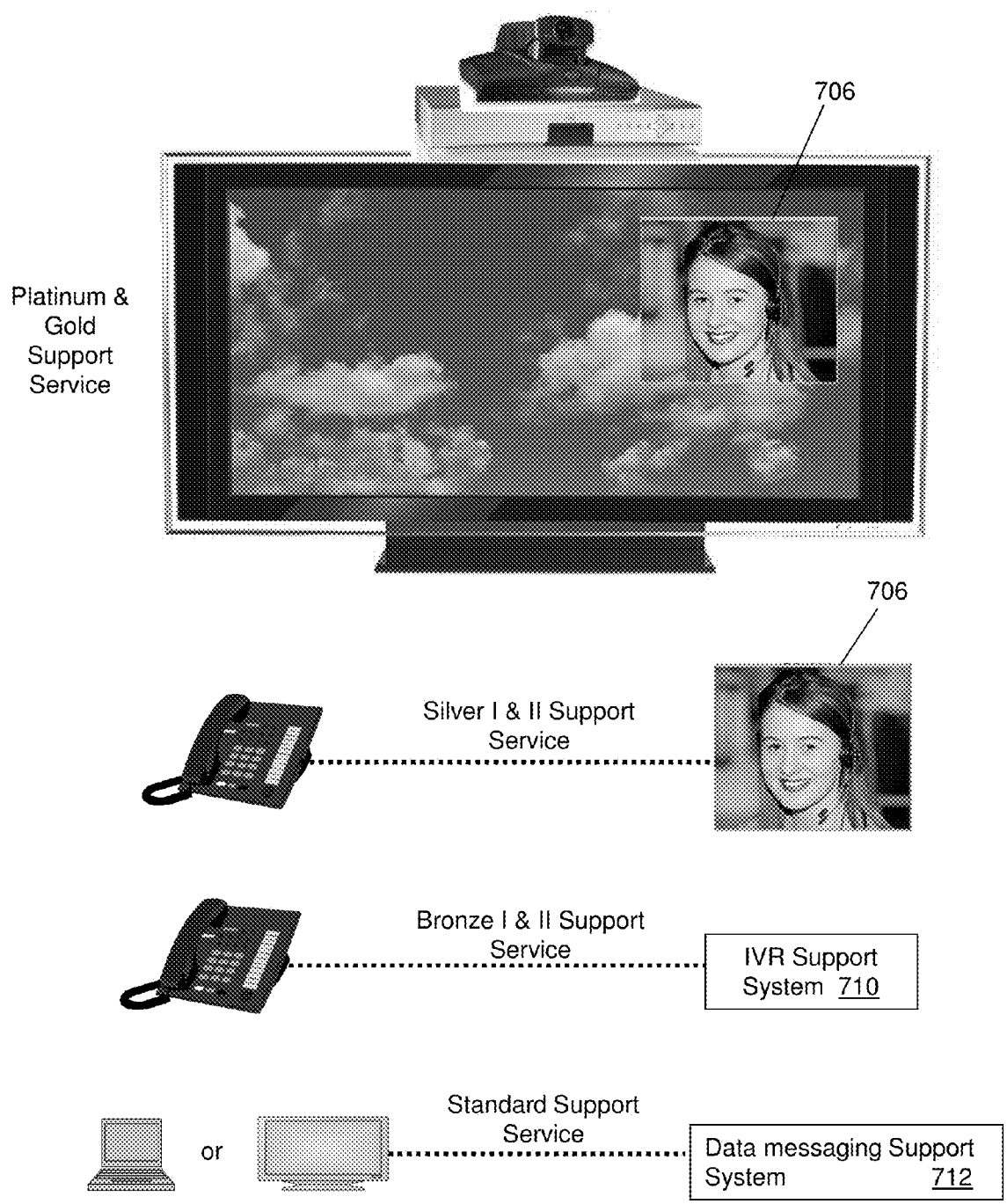
FIG. 7 depicts and exemplary illustration of support services according to the method of FIG. 6.

FIG. 7 depicts an exemplary illustration of possible support services according to method 600. For example, a service provider of IPTV can provide a platinum and gold support service which corresponds to a picture-in-picture video support service for subscribers with a grade of service that satisfies the criteria of platinum or gold subscribers. A platinum support service can represent a video support service in which a human service agent 706 is called on to assist the user of the MP as soon as possible, and in some instances immediately. This service can be distinguished from the gold support service in that requests are serviced promptly for Platinum subscribers without queuing, while Gold subscribers are queued when more than one Platinum or Gold subscriber is requesting assistance. In situations where queuing is inevitable because for example there may not be enough agents 706 to support a number of Platinum and/or Gold subscribers requesting assistance at the same time, the SSS 130 can prioritize Platinum subscribers so that they skip ahead of Gold subscribers previously waiting in queue.

Silver I & II subscribers can receive support services by way of VoIP or PSTN communications with a human agent. Silver I subscribers take priority over Silver II subscribers when queuing is involved in a manner similar to what was described for Platinum and Gold subscribers. Bronze I & II subscribers can receive support services by way of VoIP or PSTN communications to an IVR support system 710. As with the above subscribers the Bronze I subscribers take queuing priority over the Bronze II subscribers. All other subscribers can receives standard support services by way of a computing device such as a laptop computer or an Internet-capable MP accessing a data messaging support system 712 by way of portal 530 or some other suitable communication means. The data messaging support system 712 can provide support services by way of instant messaging, email, SMS, MMS, or other suitable data messaging formats.

As noted earlier, the service provider can define grades of service according to services subscribed and/or spending levels of the subscriber. The SSS 130 can schedule communications between the MP and the agent in step 618 and utilize a means of communication in step 620 suitable to the grade of service of the subscriber.

Upon reviewing the aforementioned embodiments, it would be evident to an artisan with ordinary skill in the art that said embodiments can be modified, reduced, or enhanced without departing from the scope and spirit of the claims described below. For example, method 600 can be adapted so that a service provider can define more or less grades of service than those described herein according to criteria that is suitable to the business objectives of the service provider. Method 600 can also be adapted so that subscribers who are frequent purchasers of media content can be awarded with a higher grade of service without subscribing to additional services or paying additional fees. In this embodiment, the service provider can create a point system for subscriber activities which it views favorable to its business goals. Points awarded to subscribers can be compared to thresholds for purposes of upgrading support services of the subscriber. Method 600 can also be adapted to apply to VoIP terminals with video capability, computers utilizing SIP-based softphones, cell phones with for example 3G video phone capability, and so on. Accordingly, method 600 can be adapted to operate on any computing device operating in the media communication systems of FIGS. 1-4.

Other suitable modifications that can be applied to the present disclosure without departing from the scope of the claims below. Accordingly, the reader is directed to the claims section for a fuller understanding of the breadth and scope of the present disclosure.

Figure 8:
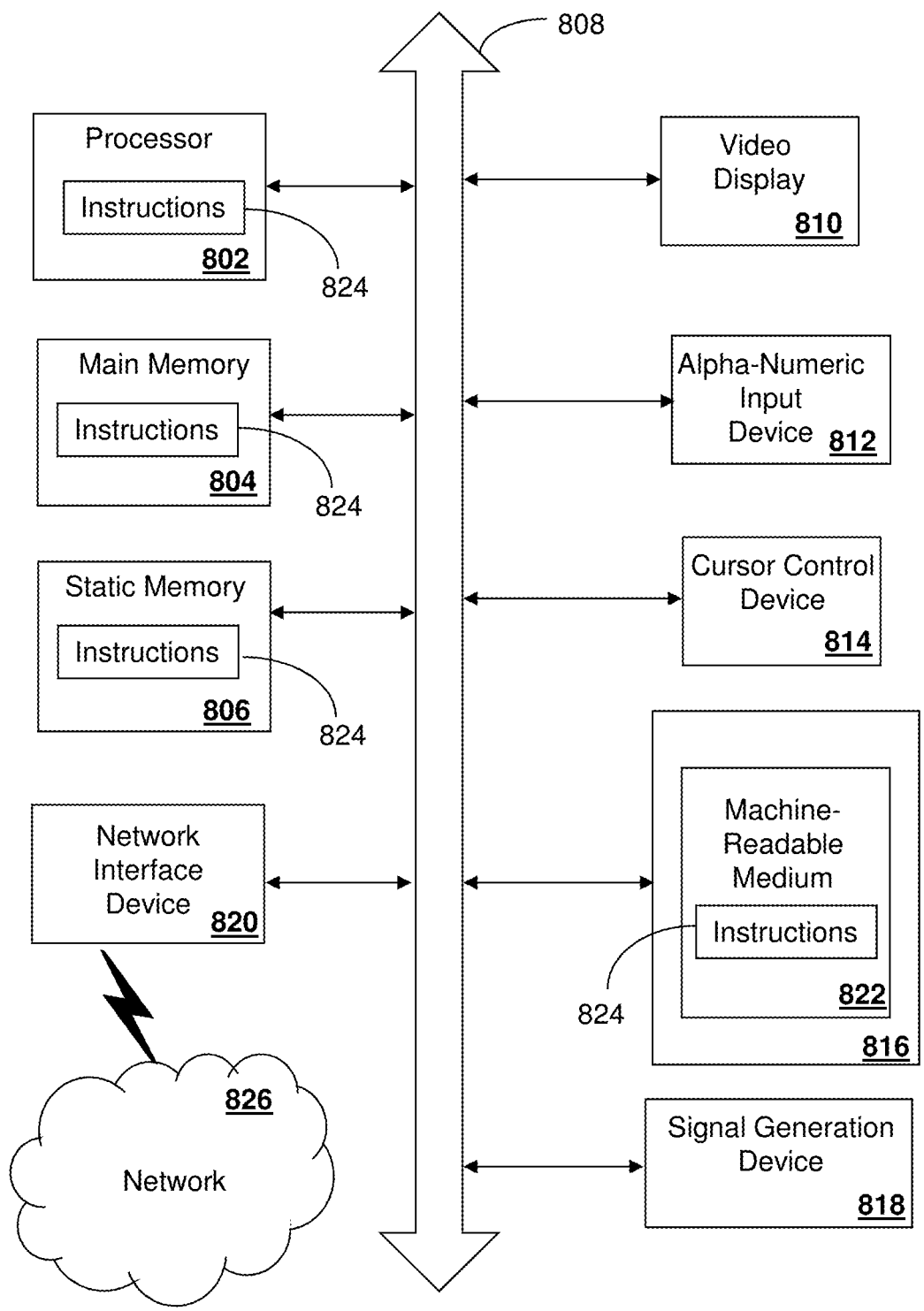
FIG. 8 is a diagrammatic representation of a machine in the form of a computer system within which a set of instructions, when executed, may cause the machine to perform any one or more of the methodologies discussed herein.

FIG. 8 depicts an exemplary diagrammatic representation of a machine in the form of a computer system 800 within which a set of instructions, when executed, may cause the machine to perform any one or more of the methodologies discussed above. In some embodiments, the machine operates as a standalone device. In some embodiments, the machine may be connected (e.g., using a network) to other machines. In a networked deployment, the machine may operate in the capacity of a server or a client user machine in server-client user network environment, or as a peer machine in a peer-to-peer (or distributed) network environment.

The machine may comprise a server computer, a client user computer, a personal computer (PC), a tablet PC, a laptop computer, a desktop computer, a control system, a network router, switch or bridge, or any machine capable of executing a set of instructions (sequential or otherwise) that specify actions to be taken by that machine. It will be understood that a device of the present disclosure includes broadly any electronic device that provides voice, video or data communication. Further, while a single machine is illustrated, the term "machine" shall also be taken to include any collection of machines that individually or jointly execute a set (or multiple sets) of instructions to perform any one or more of the methodologies discussed herein.

The computer system 800 may include a processor 802 (e.g., a central processing unit (CPU), a graphics processing unit (GPU, or both), a main memory 804 and a static memory 806, which communicate with each other via a bus 808. The computer system 800 may further include a video display unit 810 (e.g., a liquid crystal display (LCD), a flat panel, a solid state display, or a cathode ray tube (CRT)). The computer system 800 may include an input device 812 (e.g., a keyboard), a cursor control device 814 (e.g., a mouse), a disk drive unit 816, a signal generation device 818 (e.g., a speaker or remote control) and a network interface device 820.

The disk drive unit 816 may include a machine-readable medium 822 on which is stored one or more sets of instructions (e.g., software 824) embodying any one or more of the methodologies or functions described herein, including those methods illustrated above. The instructions 824 may also reside, completely or at least partially, within the main memory 804, the static memory 806, and/or within the processor 802 during execution thereof by the computer system 800. The main memory 804 and the processor 802 also may constitute machine-readable media.

Dedicated hardware implementations including, but not limited to, application specific integrated circuits, programmable logic arrays and other hardware devices can likewise be constructed to implement the methods described herein. Applications that may include the apparatus and systems of various embodiments broadly include a variety of electronic and computer systems. Some embodiments implement functions in two or more specific interconnected hardware modules or devices with related control and data signals communicated between and through the modules, or as portions of an application-specific integrated circuit. Thus, the example system is applicable to software, firmware, and hardware implementations.

In accordance with various embodiments of the present disclosure, the methods described herein are intended for operation as software programs running on a computer processor. Furthermore, software implementations can include, but not limited to, distributed processing or component/object distributed processing, parallel processing, or virtual machine processing can also be constructed to implement the methods described herein.

The present disclosure contemplates a machine readable medium containing instructions 824, or that which receives and executes instructions 824 from a propagated signal so that a device connected to a network environment 826 can send or receive voice, video or data, and to communicate over the network 826 using the instructions 824. The instructions 824 may further be transmitted or received over a network 826 via the network interface device 820.

While the machine-readable medium 822 is shown in an example embodiment to be a single medium, the term "machine-readable medium" should be taken to include a single medium or multiple media (e.g., a centralized or distributed database, and/or associated caches and servers) that store the one or more sets of instructions. The term "machine-readable medium" shall also be taken to include any medium that is capable of storing, encoding or carrying a set of instructions for execution by the machine and that cause the machine to perform any one or more of the methodologies of the present disclosure.

The term "machine-readable medium" shall accordingly be taken to include, but not be limited to: solid-state memories such as a memory card or other package that houses one or more read-only (non-volatile) memories, random access memories, or other re-writable (volatile) memories; magneto-optical or optical medium such as a disk or tape; and/or a digital file attachment to e-mail or other self-contained information archive or set of archives is considered a distribution medium equivalent to a tangible storage medium. Accordingly, the disclosure is considered to include any one or more of a machine-readable medium or a distribution medium, as listed herein and including art-recognized equivalents and successor media, in which the software implementations herein are stored.

Although the present specification describes components and functions implemented in the embodiments with reference to particular standards and protocols, the disclosure is not limited to such standards and protocols. Each of the standards for Internet and other packet switched network transmission (e.g., TCP/IP, UDP/IP, HTML, HTTP) represent examples of the state of the art. Such standards are periodically superseded by faster or more efficient equivalents having essentially the same functions. Accordingly, replacement standards and protocols having the same functions are considered equivalents.

The illustrations of embodiments described herein are intended to provide a general understanding of the structure of various embodiments, and they are not intended to serve as a complete description of all the elements and features of apparatus and systems that might make use of the structures described herein. Many other embodiments will be apparent to those of skill in the art upon reviewing the above description. Other embodiments may be utilized and derived therefrom, such that structural and logical substitutions and changes may be made without departing from the scope of this disclosure. Figures are also merely representational and may not be drawn to scale. Certain proportions thereof may be exaggerated, while others may be minimized. Accordingly, the specification and drawings are to be regarded in an illustrative rather than a restrictive sense.

Such embodiments of the inventive subject matter may be referred to herein, individually and/or collectively, by the term "invention" merely for convenience and without intending to voluntarily limit the scope of this application to any single invention or inventive concept if more than one is in fact disclosed. Thus, although specific embodiments have been illustrated and described herein, it should be appreciated that any arrangement calculated to achieve the same purpose may be substituted for the specific embodiments shown. This disclosure is intended to cover any and all adaptations or variations of various embodiments. Combinations of the above embodiments, and other embodiments not specifically described herein, will be apparent to those of skill in the art upon reviewing the above description.

The Abstract of the Disclosure is provided to comply with 37 C.F.R. §1.72(b), requiring an abstract that will allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

What is claimed is:

1. A system, comprising:
a memory for storing instructions; and
a controller coupled to the memory, wherein the controller, responsive to executing the instructions, performs operations comprising:
receiving from a set-top box a request for assistance;
identifying a subscriber account associated with the set-top box;
identifying, from the subscriber account, a media service procured by the subscriber;
determining a history of purchases of media content at the set-top box;
determining a credit history of the subscriber at the set-top box;
monitoring for a service upgrade payment at the set-top box;
determining an upgraded support service for the subscriber according to the media service procured by the subscriber, the history of purchases of media content, the credit history and the monitoring for the service upgrade payment;
selecting a subscriber support service level of a plurality of subscriber support service levels according to the upgraded support service;
establishing communications with the set-top box at the subscriber support service level, wherein the communications enable an un-queued video support service at the set-top box, wherein the un-queued video support service comprises a video communication session with a human agent, and wherein the communications further enable an interactive voice response system accessible from the set-top box for servicing the request for assistance; and scheduling communications between the set-top box and a selected subscriber support service based on the subscriber support service level, wherein the un-queued video support service comprises a picture-in-picture video communication session with the human agent, wherein each of the plurality of subscriber support services levels is associated with the upgraded support service, wherein the determining of the upgraded support service is based on a reward system wherein points are provided for pre-determined subscriber activities that correspond with business goals, and wherein the interactive voice response system utilizes voice recognition and synthesized voice responses.

2. The system of claim 1, wherein the plurality of subscriber support services levels comprise a video support service, a voice support service, the interactive voice response system, and a data messaging support service, and wherein the determining of the upgraded support service is a selection from among a group of support services, wherein a non-upgraded support service of the group of support services includes queuing of subscribers and is limited to voice support service.

3. The system of claim 2, wherein the video support service comprises one of the un-queued video support service or a queued video support service, wherein the voice support service comprises one of an un-queued voice support service or a queued voice support service, wherein the interactive voice response system comprises one of an un-queued interactive voice response system or a queued interactive voice response system, and wherein the data messaging support service comprises one of an un-queued data messaging support service or a queued data messaging support service.

4. The system of claim 1, wherein the operations further comprise:
alerting an agent that a party managing the set-top box has requested assistance;
informing the agent of a subscription grade of the subscriber of the set-top box; and
establishing communications between the agent and the set-top box.

5. The system of claim 4, wherein the agent comprises one of the human agent, the interactive voice response system, or an email support center, and wherein communications between the agent and the set-top box comprises one of video communications, voice communications, or data communications.

6. The system of claim 1, wherein the system operates in a media communication system corresponding to a broadcast television system or a cellular communication system.

7. The system of claim 1, wherein the media services comprise a cellular communications service, a cable television service, or a satellite television service.

8. A method, comprising:
receiving, by a system comprising a processor, from a media processor a request for assistance;
identifying, by the system, a subscriber associated with the media processor;
accessing, by the system, information of the subscriber identifying a media service procured by the subscriber;
determining a history of purchases of media content at the media processor;
determining a credit history of the subscriber at the media processor;
monitoring for a service upgrade payment at the media processor;
determining, by the system, an upgraded support service for the subscriber according to the media service procured by the subscriber, the history of purchases of media content, the credit history and the monitoring for the service upgrade payment;
providing, by the system, the media processor a level among a plurality of levels of a support service according to the upgraded support service provided to the subscriber; and
establishing, by the system, communications with the media processor at the upgraded support service, wherein the communications enable an un-queued video support service at the media processor, wherein the un-queued video support service comprises a video communication session with a human agent and wherein the communications further enable an interactive voice response system accessible from the media processor for servicing the request for assistance;
selecting, by the system, the support service from a plurality of support services according to a determined grade of service; and
scheduling, by the system, communications between the media processor and the support service.

9. The method of claim 8, wherein the media processor comprises a set-top box, a digital video recorder, a voice over internet protocol terminal, a public switched telephone network terminal, a computer terminal, a cellular phone, or a combination thereof.

10. The method of claim 8, wherein the support service further comprises the human agent in a picture-in-picture video communication session that can assist a party initiating the request for assistance.

11. The method of claim 10, wherein the requesting party is assisted with technical or operational issues associated with the media processor or purchasing an item by way of the media processor.

12. The method of claim 8, wherein the plurality of support services comprise a video support service, a voice support service, the interactive voice response system, or a data messaging support service.

13. The method of claim 12, wherein the video support service comprises one of the un-queued video support service or a queued video support service, wherein the voice support service comprises one of an un-queued voice support service or a queued voice support service, wherein the interactive voice response system comprises one of an un-queued interactive voice response system or a queued interactive voice response system, and wherein the data messaging support service comprises one of an un-queued data messaging support service or a queued data messaging support service.

14. The method of claim 8, comprising:
alerting, by the system, an agent of the request for assistance received from the media processor;
notifying, by the system, the agent of a grade of service of the subscriber; and
establishing, by the system, communications between the agent and the media processor.

15. The method of claim 14, wherein the agent comprises one of the human agent, the interactive voice response system, or an email support center, and wherein communications between the agent and the media processor comprises one of video communications, voice communications, or data communications.

16. The method of claim 8, wherein the method operates in a media communication system corresponding to a cable television communication system, a satellite television communication system, a public switched telephone network, a voice over internet protocol communication system, an internet protocol subsystem combining the public switched telephone network and voice over internet protocol communication systems, a cellular communication system, or a data communications system.

17. A non-transitory computer-readable storage medium in a media processor, comprising instructions, which when executed by a processor, causes the processor to perform operations, comprising:

detecting a request for assistance from a media processor;
identifying a subscriber associated with the media processor;
accessing, from an account of the subscriber, information identifying a media service procured by the subscriber;
determining a history of purchases of media content at the media processor;
determining a credit history of the subscriber at the media processor;
monitoring for a service upgrade payment at the media processor;
determining an upgraded support service for the subscriber according to the media service procured by the subscriber, the history of purchases of media content, the credit history and the monitoring for the service upgrade payment;
presenting a support service of a subscriber support service level according to the upgraded support service, wherein the support service comprises an un-queued video support service at the media processor, wherein the un-queued video support service comprises a video communication session with a human agent and wherein the support service further comprises an interactive voice response system accessible from the media processor for servicing the request for assistance;
submitting the request for assistance to a system which determines a grade of service of the subscriber from information retrieved from a subscriber account, and determines the support service according to the grade of service; and
receiving the support service from the system,
wherein the media processor comprises a set-top box, a digital video recorder, a voice over internet protocol terminal, a public switched telephone network terminal, a computer terminal, a cellular phone, or a combination thereof.

18. The non-transitory computer-readable storage medium of claim 17, wherein the media processor operates in a media communication system corresponding to a cable television communication system, a satellite television communication system, a public switched telephone network, a voice over internet protocol communication system, an internet protocol multimedia subsystem combining the public switched telephone network and voice over internet protocol communication systems, a cellular communication system, or a data communications system.

19. The non-transitory computer-readable storage medium of claim 17, wherein the instructions cause the processor to perform operations comprising presenting the support service as a video support service, a voice support service, the interactive voice response system, or a data messaging support service.

20. The non-transitory computer-readable storage medium of claim 17, wherein the media processor presents the support service as a picture-in-picture support service.

* * * * *